United States Patent
Clauson et al.

(10) Patent No.: US 10,801,371 B2
(45) Date of Patent: *Oct. 13, 2020

(54) BOWED ROTOR PREVENTION SYSTEM

(71) Applicant: United Technologies Corporation, Farmington, CT (US)

(72) Inventors: Jesse W. Clauson, Agawam, MA (US); Tyler J. Selstad, West Hartford, CT (US)

(73) Assignee: RAYTHEON TECHNOLOGIES COPRORATION, Farmington, CT (US)

( * ) Notice: Subject to any disclaimer, the term of this patent is extended or adjusted under 35 U.S.C. 154(b) by 853 days.

This patent is subject to a terminal disclaimer.

(21) Appl. No.: 15/582,907

(22) Filed: May 1, 2017

(65) Prior Publication Data
US 2018/0274390 A1 Sep. 27, 2018

Related U.S. Application Data

(63) Continuation of application No. 15/042,331, filed on Feb. 12, 2016, now Pat. No. 9,664,070.

(51) Int. Cl.
*F01D 25/34* (2006.01)
*F01D 25/36* (2006.01)
(Continued)

(52) U.S. Cl.
CPC .............. *F01D 25/36* (2013.01); *F01D 21/00* (2013.01); *F02C 7/275* (2013.01); *F02C 7/277* (2013.01);
(Continued)

(58) Field of Classification Search
CPC .......... F01D 21/00; F01D 21/06; F01D 25/34; F01D 25/36; F05D 2260/532; F05D 2270/114; F02C 7/277
See application file for complete search history.

(56) References Cited

U.S. PATENT DOCUMENTS 1,951,875 A 3/1934 Laabs
2,617,253 A 11/1952 Fusner et al.
(Continued)

FOREIGN PATENT DOCUMENTS

EP 1396611 3/2004
EP 1533479 A2 5/2005
(Continued)

OTHER PUBLICATIONS

U.S. Appl. No. 15/042,331 Non-Final Office Action dated Sep. 9, 2016, 37 pages.
(Continued)

*Primary Examiner* — Lorne E Meade
(74) *Attorney, Agent, or Firm* — Cantor Colburn LLP

(57) ABSTRACT

A bowed rotor prevention system for a gas turbine engine includes a bowed rotor prevention motor. A motor shaft of the bowed rotor prevention motor is operable to drive rotation of the gas turbine engine through an engine accessory gearbox. The motor shaft interfaces with an air turbine operable to rotate an output shaft mechanically linked to the engine accessory gearbox. The bowed rotor prevention system also includes a controller operable to engage the bowed rotor prevention motor and drive rotation of the gas turbine engine below an engine starting speed until a bowed rotor prevention threshold condition is met.

17 Claims, 4 Drawing Sheets

(51) Int. Cl.
  *F02C 7/277* (2006.01)
  *F01D 21/00* (2006.01)
  *F02C 7/275* (2006.01)

(52) U.S. Cl.
  CPC .......... *F01D 25/34* (2013.01); *F05D 2220/32* (2013.01); *F05D 2260/532* (2013.01); *F05D 2260/85* (2013.01); *F05D 2270/114* (2013.01); *Y02T 50/671* (2013.01)

(56) References Cited

U.S. PATENT DOCUMENTS

| | | |
|---|---|---|
| 2,962,597 A | 11/1960 | Evans |
| 3,057,155 A | 10/1962 | Rizk |
| 3,151,452 A | 10/1964 | Bunger et al. |
| 3,290,709 A | 12/1966 | Whitenack, Jr. et al. |
| 3,360,844 A | 1/1968 | Wonneman |
| 3,764,815 A | 10/1973 | Habock et al. |
| 3,793,905 A | 2/1974 | Black et al. |
| 3,898,439 A | 8/1975 | Reed et al. |
| 3,951,008 A | 4/1976 | Schneider et al. |
| 4,044,550 A | 8/1977 | Vermilye |
| 4,069,424 A | 1/1978 | Burkett |
| 4,120,159 A | 10/1978 | Matsumoto et al. |
| 4,144,421 A | 3/1979 | Sakai |
| 4,302,813 A | 11/1981 | Kurihara et al. |
| 4,353,604 A | 10/1982 | Dulberger et al. |
| 4,380,146 A | 4/1983 | Yannone et al. |
| 4,426,641 A | 1/1984 | Kurihara et al. |
| 4,435,770 A | 3/1984 | Shiohata et al. |
| 4,437,163 A | 3/1984 | Kurihara et al. |
| 4,453,407 A | 6/1984 | Sato et al. |
| 4,485,678 A | 12/1984 | Fanuele |
| 4,488,240 A | 12/1984 | Kapadia et al. |
| 4,496,252 A | 1/1985 | Horler et al. |
| 4,598,551 A | 7/1986 | Dimitroff, Jr. et al. |
| 4,627,234 A | 12/1986 | Schuh |
| 4,642,782 A | 2/1987 | Kemper et al. |
| 4,669,893 A | 6/1987 | Chalaire et al. |
| 4,713,985 A | 12/1987 | Ando |
| 4,733,529 A | 3/1988 | Nelson et al. |
| 4,747,270 A | 5/1988 | Klie et al. |
| 4,854,120 A | 8/1989 | Nelson et al. |
| 4,862,009 A | 8/1989 | King |
| 4,979,362 A | 12/1990 | Vershure, Jr. |
| 5,103,629 A | 4/1992 | Mumford et al. |
| 5,123,239 A | 6/1992 | Rodgers |
| 5,127,220 A | 7/1992 | Jesrai et al. |
| 5,174,109 A | 12/1992 | Lampe |
| 5,184,458 A | 2/1993 | Lampe et al. |
| 5,201,798 A | 4/1993 | Hogan |
| 5,349,814 A | 9/1994 | Ciokajlo et al. |
| 6,146,090 A | 11/2000 | Schmidt |
| 6,168,377 B1 | 1/2001 | Wolfe et al. |
| 6,190,127 B1 | 2/2001 | Schmidt |
| 6,318,958 B1 | 11/2001 | Giesler et al. |
| 6,478,534 B2 | 11/2002 | Bangert et al. |
| 6,498,978 B2 | 12/2002 | Leamy et al. |
| 6,517,314 B1 | 2/2003 | Burnett et al. |
| 6,558,118 B1 | 5/2003 | Brisson et al. |
| 6,681,579 B2 | 1/2004 | Lane et al. |
| 6,762,512 B2 | 7/2004 | Nelson |
| 7,104,072 B2 | 9/2006 | Thompson |
| 7,133,801 B2 | 11/2006 | Song |
| 7,409,319 B2 | 8/2008 | Kant et al. |
| 7,428,819 B2 | 9/2008 | Cataldi et al. |
| 7,507,070 B2 | 3/2009 | Jones |
| 7,543,439 B2 | 6/2009 | Butt et al. |
| 7,587,133 B2 | 9/2009 | Franke et al. |
| 7,742,881 B2 | 6/2010 | Muralidharan et al. |
| 7,798,720 B1 | 9/2010 | Walsh |
| 7,909,566 B1 | 3/2011 | Brostmeyer |
| 7,972,105 B2 | 7/2011 | Dejoris et al. |
| 8,090,456 B2 | 1/2012 | Karpman et al. |
| 8,291,715 B2 | 10/2012 | Libera et al. |
| 8,306,776 B2 | 11/2012 | Ihara et al. |
| 8,770,913 B1 | 7/2014 | Negron et al. |
| 8,776,530 B2 | 7/2014 | Shirooni et al. |
| 8,820,046 B2 | 9/2014 | Ross et al. |
| 8,918,264 B2 | 12/2014 | Jegu et al. |
| 9,086,018 B2 | 7/2015 | Winston et al. |
| 9,121,309 B2 | 9/2015 | Geiger |
| 9,429,510 B2 | 8/2016 | Belsom et al. |
| 9,664,070 B1 * | 5/2017 | Clauson .................. F01D 25/36 |
| 9,699,833 B2 | 7/2017 | Broughton et al. |
| 9,845,730 B2 | 12/2017 | Betti et al. |
| 9,970,328 B2 * | 5/2018 | Haerms .................. F01D 21/06 |
| 9,988,928 B2 | 6/2018 | Popescu et al. |
| 2002/0173897 A1 | 11/2002 | Leamy et al. |
| 2003/0145603 A1 | 8/2003 | Reed et al. |
| 2004/0065091 A1 | 4/2004 | Anderson |
| 2004/0131138 A1 | 7/2004 | Correia et al. |
| 2006/0032234 A1 | 2/2006 | Thompson |
| 2006/0188372 A1 | 8/2006 | Hansen |
| 2006/0260323 A1 | 11/2006 | Moulebhar |
| 2007/0031249 A1 | 2/2007 | Jones |
| 2007/0151258 A1 | 7/2007 | Gaines et al. |
| 2008/0072568 A1 | 3/2008 | Moniz et al. |
| 2009/0246018 A1 | 10/2009 | Kondo et al. |
| 2009/0301053 A1 | 12/2009 | Geiger |
| 2009/0314002 A1 | 12/2009 | Libera et al. |
| 2010/0095791 A1 | 4/2010 | Galloway |
| 2010/0132365 A1 | 6/2010 | Labala |
| 2010/0293961 A1 | 11/2010 | Tong et al. |
| 2010/0326085 A1 | 12/2010 | Veilleux |
| 2011/0077783 A1 | 3/2011 | Karpman et al. |
| 2011/0146276 A1 | 6/2011 | Sathyanarayana et al. |
| 2011/0153295 A1 | 6/2011 | Yerramalla et al. |
| 2011/0289936 A1 | 12/2011 | Suciu et al. |
| 2011/0296843 A1 | 12/2011 | Lawson, Jr. |
| 2011/0308345 A1 | 12/2011 | Makulec et al. |
| 2012/0031067 A1 | 2/2012 | Sundaram et al. |
| 2012/0121373 A1 | 5/2012 | Short et al. |
| 2012/0240591 A1 | 9/2012 | Snider et al. |
| 2012/0266601 A1 | 10/2012 | Miller |
| 2012/0316748 A1 | 12/2012 | Jegu et al. |
| 2013/0031912 A1 | 2/2013 | Finney et al. |
| 2013/0091850 A1 | 4/2013 | Francisco |
| 2013/0101391 A1 | 4/2013 | Szwedowicz et al. |
| 2013/0134719 A1 | 5/2013 | Watanabe et al. |
| 2013/0251501 A1 | 9/2013 | Araki et al. |
| 2014/0060076 A1 | 3/2014 | Cortelli et al. |
| 2014/0123673 A1 | 5/2014 | Mouze et al. |
| 2014/0199157 A1 | 7/2014 | Haerms et al. |
| 2014/0236451 A1 | 8/2014 | Gerez et al. |
| 2014/0241878 A1 | 8/2014 | Herrig et al. |
| 2014/0271152 A1 | 9/2014 | Rodriguez |
| 2014/0301820 A1 | 10/2014 | Lohse et al. |
| 2014/0318144 A1 | 10/2014 | Lazzeri et al. |
| 2014/0334927 A1 | 11/2014 | Hammerum |
| 2014/0366546 A1 | 12/2014 | Bruno et al. |
| 2014/0373518 A1 | 12/2014 | Manneville et al. |
| 2014/0373552 A1 | 12/2014 | Zaccaria et al. |
| 2014/0373553 A1 | 12/2014 | Zaccaria et al. |
| 2014/0373554 A1 | 12/2014 | Pech et al. |
| 2015/0016949 A1 | 1/2015 | Smith |
| 2015/0115608 A1 | 4/2015 | Draper |
| 2015/0121874 A1 | 5/2015 | Yoshida et al. |
| 2015/0128592 A1 | 5/2015 | Filiputti et al. |
| 2015/0159625 A1 | 6/2015 | Hawdwicke, Jr. et al. |
| 2015/0219121 A1 | 8/2015 | King |
| 2015/0377141 A1 | 12/2015 | Foiret |
| 2016/0236369 A1 | 8/2016 | Baker |
| 2016/0245312 A1 | 8/2016 | Morice |
| 2016/0265387 A1 | 9/2016 | Duong et al. |
| 2016/0288325 A1 | 10/2016 | Naderer et al. |
| 2017/0030265 A1 | 2/2017 | O'Toole et al. |
| 2017/0218848 A1 | 8/2017 | Alstad et al. |
| 2017/0233103 A1 | 8/2017 | Teicholz et al. |
| 2017/0234158 A1 | 8/2017 | Savela |
| 2017/0234166 A1 | 8/2017 | Dube et al. |

(56) References Cited

U.S. PATENT DOCUMENTS

| | | |
|---|---|---|
| 2017/0234167 A1 | 8/2017 | Stachowiak et al. |
| 2017/0234230 A1 | 8/2017 | Schwarz et al. |
| 2017/0234231 A1 | 8/2017 | Virtue, Jr. et al. |
| 2017/0234232 A1 | 8/2017 | Sheridan et al. |
| 2017/0234233 A1 | 8/2017 | Schwarz et al. |
| 2017/0234235 A1 | 8/2017 | Pech |
| 2017/0234236 A1 | 8/2017 | Feulner et al. |
| 2017/0234238 A1 | 8/2017 | Schwarz et al. |
| 2018/0010480 A1 | 1/2018 | Hockaday et al. |
| 2018/0265223 A1 | 9/2018 | Teicholz et al. |
| 2018/0327117 A1 | 11/2018 | Teicholz et al. |

FOREIGN PATENT DOCUMENTS

| | | |
|---|---|---|
| EP | 1862875 | 12/2007 |
| EP | 2006496 | 12/2008 |
| EP | 2305986 | 4/2011 |
| EP | 2363575 A2 | 9/2011 |
| EP | 2871333 | 5/2015 |
| EP | 3051074 | 8/2016 |
| FR | 2933131 | 1/2010 |
| GB | 1374810 | 11/1974 |
| GB | 2117842 | 10/1983 |
| GB | 2218751 | 11/1989 |
| IN | 201408865 | 5/2015 |
| JP | 2002371806 | 12/2002 |
| JP | 2004036414 | 2/2004 |
| WO | 9900585 | 1/1999 |
| WO | 2013007912 | 1/2013 |
| WO | 2014152701 | 9/2014 |
| WO | 2015030946 | 3/2015 |
| WO | 2016069303 | 5/2016 |

OTHER PUBLICATIONS

EP Application No. 17155683 Office Action dated May 22, 2018, 2 pages.
EP Application No. 17155698.8 Office Action dated Sep. 27, 2018, 3 pages.
EP Application No. 17155798.6 Office Action dated Sep. 21, 2018, 3 pages.
EP Application No. 17155612.9 Office Action dated Oct. 2, 2018, 3 pages.
EP Application No. 17155584 Extended European Search Report dated Jul. 6, 2017, 9 pages.
EP Application No. 17155601 Extended European Search Report dated Jun. 30, 2017, 7 pages.
EP Application No. 17155612 Extended European Search Report dated Jul. 4, 2017, 8 pages.
EP Application No. 17155613 Extended European Search Report dated Jun. 27, 2017, 10 pages.
EP Application No. 17155683 Extended European Search Report dated Jun. 30, 2017, 8 pages.
EP Application No. 17155687 Extended European Search Report dated Jun. 16, 2017, 9 pages.
EP Application No. 17155698 Extended European Search Report dated Jun. 21, 2017, 9 pages.
EP Application No. 17155721 Extended European Search Report dated Jun. 27, 2017, 8 pages.
EP Application No. 17155793 Extended European Search Report dated Jun. 30, 2017, 10 pages.
EP Application No. 17155798 Extended European Search Report dated Jun. 30, 2017, 9 pages.
EP Application No. 17155807 Extended European Search Report dated Jul. 3, 2017, 8 pages.
Extended European Search Report for Application No. 17179407.6-1610 dated Dec. 5, 2017 (8 pp.).

* cited by examiner

BOWED ROTOR PREVENTION SYSTEM

CROSS-REFERENCE TO RELATED APPLICATIONS

This application is a continuation of U.S. patent application Ser. No. 15/042,331 filed Feb. 12, 2016, the disclosure of which is incorporated by reference herein in its entirety.

BACKGROUND

This disclosure relates to gas turbine engines, and more particularly to a bowed rotor prevention system.

Gas turbine engines are used in numerous applications, one of which is for providing thrust to an aircraft. When a gas turbine engine of an aircraft has been shut off for example, after an aircraft has landed at an airport, the engine is hot and due to heat rise, the upper portions of the engine will be hotter than lower portions of the engine. When this occurs thermal expansion may cause deflection of components of the engine which may result in a "bowed rotor" condition. If a gas turbine engine is in such a "bowed rotor" condition it is undesirable to restart or start the engine.

Accordingly, it is desirable to provide a method and/or apparatus for preventing a "bowed rotor" condition.

BRIEF DESCRIPTION

In one embodiment, a bowed rotor prevention system for a gas turbine engine includes a bowed rotor prevention motor. A motor shaft of the bowed rotor prevention motor is operable to drive rotation of the gas turbine engine through an engine accessory gearbox. The motor shaft interfaces with an air turbine operable to rotate an output shaft mechanically linked to the engine accessory gearbox. The bowed rotor prevention system also includes a controller operable to engage the bowed rotor prevention motor and drive rotation of the gas turbine engine below an engine starting speed until a bowed rotor prevention threshold condition is met.

In addition to one or more of the features described above, or as an alternative to any of the foregoing embodiments, further embodiments may include where the bowed rotor prevention motor is an electric motor and the controller is operable to control a flow of electric current from a power supply to the bowed rotor prevention motor.

In addition to one or more of the features described above, or as an alternative to any of the foregoing embodiments, further embodiments may include where the controller is operable to engage the bowed rotor prevention motor based on detecting an engine shutdown condition of the gas turbine engine.

In addition to one or more of the features described above, or as an alternative to any of the foregoing embodiments, further embodiments may include where the output shaft is driven to rotate by the air turbine responsive to rotation of the motor shaft and responsive to an airflow across the air turbine.

In addition to one or more of the features described above, or as an alternative to any of the foregoing embodiments, further embodiments may include where the output shaft is coupled to an air turbine starter gearbox that is mechanically linked through a clutch to the engine accessory gearbox.

In addition to one or more of the features described above, or as an alternative to any of the foregoing embodiments, further embodiments may include where a rotational force received at the engine accessory gearbox as driven by the motor shaft rotates a high pressure spool of the gas turbine engine.

In addition to one or more of the features described above, or as an alternative to any of the foregoing embodiments, further embodiments may include where the motor shaft is mechanically linked to the air turbine through a clutch.

In addition to one or more of the features described above, or as an alternative to any of the foregoing embodiments, further embodiments may include where an output bevel gear of the output shaft interfaces with a motor bevel gear of the motor shaft, and an input bevel gear of an air turbine starter drive shaft interfaces with the motor bevel gear at a gear interface of the bowed rotor prevention system.

In addition to one or more of the features described above, or as an alternative to any of the foregoing embodiments, further embodiments may include where the bowed rotor prevention threshold condition is a predetermined period of time.

In addition to one or more of the features described above, or as an alternative to any of the foregoing embodiments, further embodiments may include where the controller is operable to disengage the bowed rotor prevention motor based on receiving a maintenance request.

In addition to one or more of the features described above, or as an alternative to any of the foregoing embodiments, further embodiments may include where one or more of a hydraulic pump and an electric generator are disengaged from the engine accessory gearbox when the bowed rotor prevention motor is commanded to turn.

In addition to one or more of the features described above, or as an alternative to any of the foregoing embodiments, further embodiments may include where the gas turbine engine is a turbofan engine.

In addition to one or more of the features described above, or as an alternative to any of the foregoing embodiments, further embodiments may include where the bowed rotor prevention motor drives rotation of turbomachinery of the gas turbine engine at less than 1000 revolutions per minute.

In another embodiment, a gas turbine engine includes an engine accessory gearbox configured to be coupled to a high pressure spool and a bowed rotor prevention system. The bowed rotor prevention system includes a bowed rotor prevention motor with a motor shaft operable to drive rotation of the gas turbine engine through the engine accessory gearbox. The motor shaft interfaces with an air turbine operable to rotate an output shaft mechanically linked to the engine accessory gearbox. The bowed rotor prevention system also includes a controller operable to engage the bowed rotor prevention motor and drive rotation of the gas turbine engine below an engine starting speed until a bowed rotor prevention threshold condition is met.

In a further embodiment, a method of bowed rotor prevention for a gas turbine engine includes engaging a bowed rotor prevention motor with turbomachinery of the gas turbine engine through an engine accessory gearbox of the gas turbine engine. A motor shaft of the bowed rotor prevention motor interfaces with an air turbine operable to rotate an output shaft mechanically linked to the engine accessory gearbox. Rotation of turbomachinery of the gas turbine engine is driven by the bowed rotor prevention motor below an engine starting speed until a bowed rotor prevention threshold condition is met.

In addition to one or more of the features described above, or as an alternative to any of the foregoing embodiments, further embodiments may include interfacing an output bevel gear of the output shaft with a motor bevel gear of the motor shaft, and interfacing an input bevel gear of an air turbine starter drive shaft with the motor bevel gear.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

Figure 1:
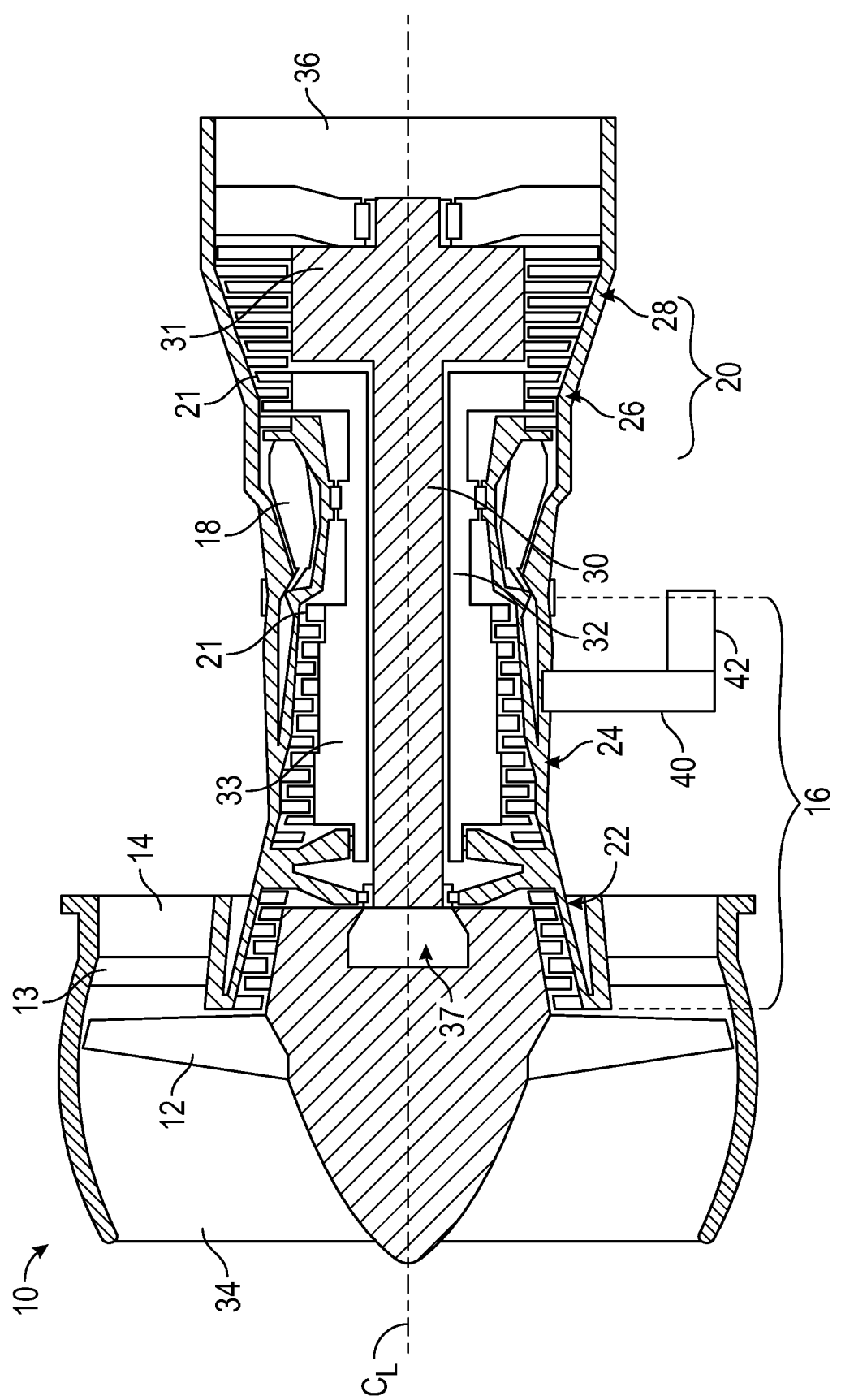
FIG. 1 is a cross-sectional view of a gas turbine engine.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present disclosure may include features and components not specifically shown in the drawings. Like reference numerals identify similar structural elements.

DETAILED DESCRIPTION

Various embodiments of the present disclosure are related to bowed rotor prevention in a gas turbine engine. Embodiments prevent a bowed rotor condition by using a bowed rotor prevention motor to drive rotation of the gas turbine engine through an engine accessory gearbox. The bowed rotor prevention motor can rotate turbomachinery of the gas turbine engine at very low speed (e.g., <5 revolutions per minute (RPM)) in order to equalize the thermal gradient of the rotating parts after engine shutdown. The bowed rotor prevention motor can interface through any of the gear-driven accessories of the engine, such as an air turbine starter. The power requirements of the bowed rotor prevention motor are substantially reduced in that the rotation needed to equalize the thermal gradients may be on the order of 1-3 RPM. Upon engine shutdown, the bowed rotor prevention motor can be controlled to rotate the turbomachinery, e.g., a high pressure spool of the gas turbine engine, for a predetermined period of time (30-40 minutes, for example). By slow and/or periodic rotation of the turbomachinery, the thermal gradient is avoided, and thus a bow condition is prevented/eliminated.

Embodiments avoid high speed rotation (e.g., 5000-7000 RPM) of the engine after shutdown and also avoid requiring a flight crew to monitor the temperature of each engine of a multi-engine aircraft for several minutes prior to restarting each engine. Rather than using a ground cart or other external source to drive engine rotation (e.g., an external pneumatic system) or an auxiliary power unit of the aircraft that is typically used to rotate turbomachinery of the engine at a starting speed, embodiments use a low-speed and high torque electric motor as the bowed rotor prevention motor operable to slowly rotate (e.g., <5 RPM) the turbomachinery after engine shutdown. Embodiments of the bowed rotor prevention motor can be dedicated for use in bowed rotor prevention, and as such, sized with a lower weight and volume than would be needed to drive rotation of the engine at or above an engine starting speed.

Various embodiments of this disclosure may be applied on any turbomachinery component that requires cooling after shutdown. For example, gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

Gas turbine engines provide efficient, reliable power for a wide range of applications, including aviation and industrial power generation. Smaller-scale engines such as auxiliary power units typically utilize a one-spool design, with co-rotating compressor and turbine sections. Larger-scale jet engines and industrial gas turbines are generally arranged into a number of coaxially nested spools, which operate at different pressures and temperatures, and rotate at different speeds.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Aviation applications include turbojet, turbofan, turboprop and turboshaft engines. In turbojet engines, thrust is generated primarily from the exhaust. Modern fixed-wing aircraft generally employ turbofan and turboprop designs, in which the low pressure spool is coupled to a propulsion fan or propeller. Turboshaft engines are typically used on rotary-wing aircraft, including helicopters.

Turbofan engines are commonly divided into high and low bypass configurations. High bypass turbofans generate thrust primarily from the fan, which drives airflow through a bypass duct oriented around the engine core. This design is common on commercial aircraft and military transports, where noise and fuel efficiency are primary concerns. Low bypass turbofans generate proportionally more thrust from the exhaust flow, providing greater specific thrust for use on high-performance aircraft, including supersonic jet fighters. Unducted (open rotor) turbofans and ducted propeller engines are also known, in a variety of counter-rotating and aft-mounted configurations.

Referring now to FIG. 1, a cross-sectional view of a gas turbine engine 10, in a turbofan configuration is illustrated. The illustrated gas turbine engine 10 includes a propulsion fan 12 mounted inside a bypass duct 14 upstream of a fan exit guide vane 13. A power core of the engine is formed by a compressor section 16, a combustor 18 and a turbine section 20. Rotor blades (or airfoils) 21 in the compressor section 16 and/or the turbine section 20 may be subject to deflection or bowing if a thermal gradient forms after engine shutdown.

In the two-spool, high bypass configuration of FIG. 1, compressor section 16 includes a low pressure compressor 22 and a high pressure compressor 24. The turbine section 20 includes high a pressure turbine 26 and a low pressure turbine 28.

The low pressure compressor 22 is rotationally coupled to the low pressure turbine 28 via a low pressure shaft 30, thereby forming the low pressure spool or low spool 31. High pressure compressor 24 is rotationally coupled to the high pressure turbine 26 via a high pressure shaft 32, forming the high pressure spool or high spool 33.

During operation of the gas turbine engine 10, the fan 12 accelerates air flow from an inlet 34 through bypass duct 14, generating thrust. The core airflow is compressed in the low pressure compressor 22 and the high pressure compressor 24 and then the compressed airflow is mixed with fuel in the combustor 18 and ignited to generate combustion gas.

The combustion gas expands to drive the high and low pressure turbines 26 and 28, which are rotationally coupled to high pressure compressor 24 and low pressure compressor 22, respectively. Expanded combustion gases exit through exhaust nozzle 36, which is shaped to generate additional thrust from the exhaust gas flow.

In advanced turbofan designs, the low pressure shaft 30 may be coupled to fan 12 via geared drive mechanism 37, providing improved fan speed control for increased efficiency and reduced engine noise. Propulsion fan 12 may also function as a first-stage compressor for gas turbine engine 10, with low pressure compressor 22 performing as an intermediate-stage compressor or booster. Alternatively, the low pressure compressor stages are absent, and air from fan 12 is provided directly to high pressure compressor 24, or to an independently rotating intermediate compressor spool.

An engine accessory gearbox 40 is mechanically coupled to a rotating portion of the gas turbine engine 10, such as the high pressure spool 33. Rotation of various engine accessories can be driven through the engine accessory gearbox 40, such as pumps 41A and electric generators 41B of FIGS. 2-4. In embodiments, a bowed rotor prevention system 42 is coupled through the engine accessory gearbox 40 and may be integrally formed with an engine accessory, such as an air turbine starter.

The gas turbine engine 10 may have a range of different shaft and spool geometries, including one-spool, two-spool and three-spool configurations, in both co-rotating and counter-rotating designs. Gas turbine engine 10 may also be configured as a low bypass turbofan, an open-rotor turbofan, a ducted or un-ducted propeller engine, or an industrial gas turbine.

Figure 2:
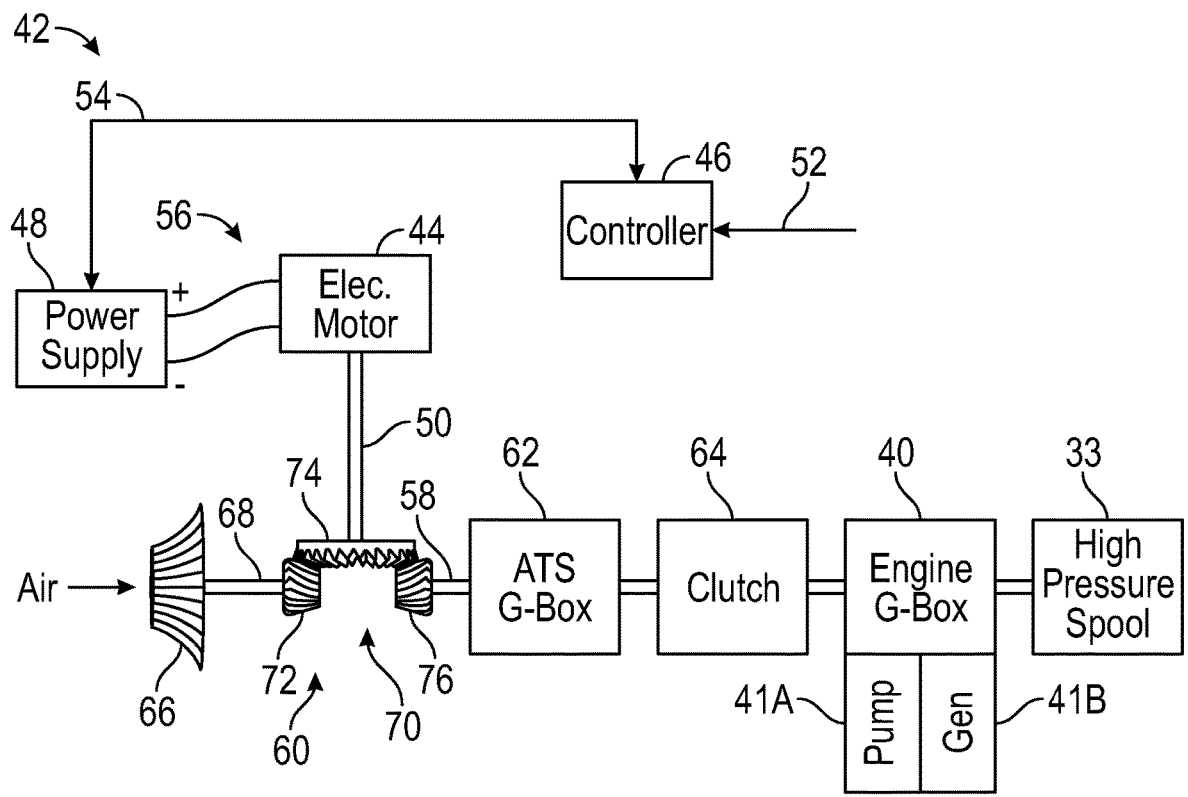
FIG. 2 is a block diagram of a bowed rotor prevention system according to an embodiment of the disclosure.

FIG. 2 is a block diagram of the bowed rotor prevention system 42 according to an embodiment. In the example of FIG. 2, the bowed rotor prevention system 42 includes a bowed rotor prevention motor 44 (or motor 44), a controller 46, and a power supply 48. The bowed rotor prevention motor 44 may be an electric motor that drives a motor shaft 50 responsive to an electric current from the power supply 48. In an embodiment, the bowed rotor prevention motor 44 is incapable of driving rotation of the gas turbine engine 10 of FIG. 1 at a sufficient speed to start combustion within the gas turbine engine 10. In an embodiment, the bowed rotor prevention motor 44 drives rotation the gas turbine engine 10 at less than 1000 RPM and may be incapable of producing sufficient horsepower to reach higher speeds when driving engine rotation. The controller 46 is operable to control a flow of electric current from the power supply 48 to the bowed rotor prevention motor 44. The controller 46 is operable to engage the bowed rotor prevention motor 44 based on detecting an engine shutdown condition of the gas turbine engine 10 of FIG. 1. For example, the controller 46 can receive an engine shutdown indicator 52 from an engine control (not depicted) of the gas turbine engine 10 of FIG. 1. Alternatively, the engine shutdown indicator 52 may be received from another source, such as a sensor, an aircraft communication bus, a discrete switch, or the like. The controller 46 can use a power supply interface 54 to control the flow of electric current on one or more power supply lines 56 between the power supply 48 and the bowed rotor prevention motor 44. The flow of electric current can be controlled using one or more switching elements, such as relays, (not depicted) through the power supply interface 54. The power supply interface 54 may also enable the controller 46 to monitor the power supply 48 and/or back electromotive force of the bowed rotor prevention motor 44.

The controller 46 may include memory to store instructions that are executed by a processor. The executable instructions may be stored or organized in any manner and at any level of abstraction, such as in connection with a controlling and/or monitoring operation of one or more systems of the gas turbine engine 10 of FIG. 1. The processor can be any type of central processing unit (CPU), including a general purpose processor, a digital signal processor, a microcontroller, an application specific integrated circuit (ASIC), a field programmable gate array, or the like. Also, in embodiments, the memory may include random access memory (RAM), read only memory (ROM), or other electronic, optical, magnetic, or any other computer readable medium onto which is stored data and control algorithms in a non-transitory form. The controller 46 can be embodied in an individual line-replaceable unit, within a control system (e.g., in an electronic engine control), and/or distributed between multiple electronic systems.

In the example of FIG. 2, the motor shaft 50 is mechanically linked to an air turbine starter drive shaft 58 of an air turbine starter 60. The air turbine starter drive shaft 58 is coupled to an air turbine starter gearbox 62 that is mechanically linked through a clutch 64 to the engine accessory gearbox 40. The clutch 64 may be a one-way driven clutch such that rotation of the high pressure spool 33 does not drive rotation of the bowed rotor prevention motor 44. The air turbine start 60 also includes an air turbine 66 operable to rotate an output shaft 68 of the air turbine starter 60. A gear interface 70 translates rotational motion of the output shaft 68 and of the motor shaft 50 to the air turbine starter drive shaft 58. In the example of FIG. 2, an output bevel gear 72 of the output shaft 68 interfaces with a motor bevel gear 74 of the motor shaft 50. An input bevel gear 76 of the air turbine starter drive shaft 58 interfaces with the motor bevel gear 74 at the gear interface 70 of the bowed rotor prevention system 42. Rather than rotation of the air turbine 66 directly driving rotation of the air turbine starter drive shaft 58, the motor bevel gear 74 is interposed such that air-driven or motor-driven rotation can drive the rotation of the air turbine starter drive shaft 58. Thus, a rotational force received at the engine accessory gearbox 40 may be driven by rotation of the motor shaft 50 to rotate the high pressure spool 33 of the gas turbine engine 10 of FIG. 1 absent airflow across the air turbine 66.

Other control aspects related to the bowed rotor prevention system 42 can be managed by the controller 46 and/or other controllers, such as a full authority digital engine control (FADEC). For example, the controller 46 may disengage the bowed rotor prevention motor 44, e.g., disable power through the power supply interface 54, based on receiving a maintenance request to prevent the bowed rotor prevention motor 44 from driving rotation of the motor shaft 50 when a maintenance operation will be performed. Further control aspects can include disengaging one or more hydraulic pumps 41A and one or more electric generators 41B coupled to the engine accessory gearbox 40 when the bowed rotor prevention motor 44 is commanded to turn the motor shaft 50.

While a specific configuration of the gear interface 70 is depicted in FIG. 2, other configurations are contemplated within the scope of embodiments. For instance, the motor shaft 50 may interface directly with the air turbine starter gearbox 62, and the output shaft 68 may directly interface with the air turbine starter gearbox 62.

Figure 3:
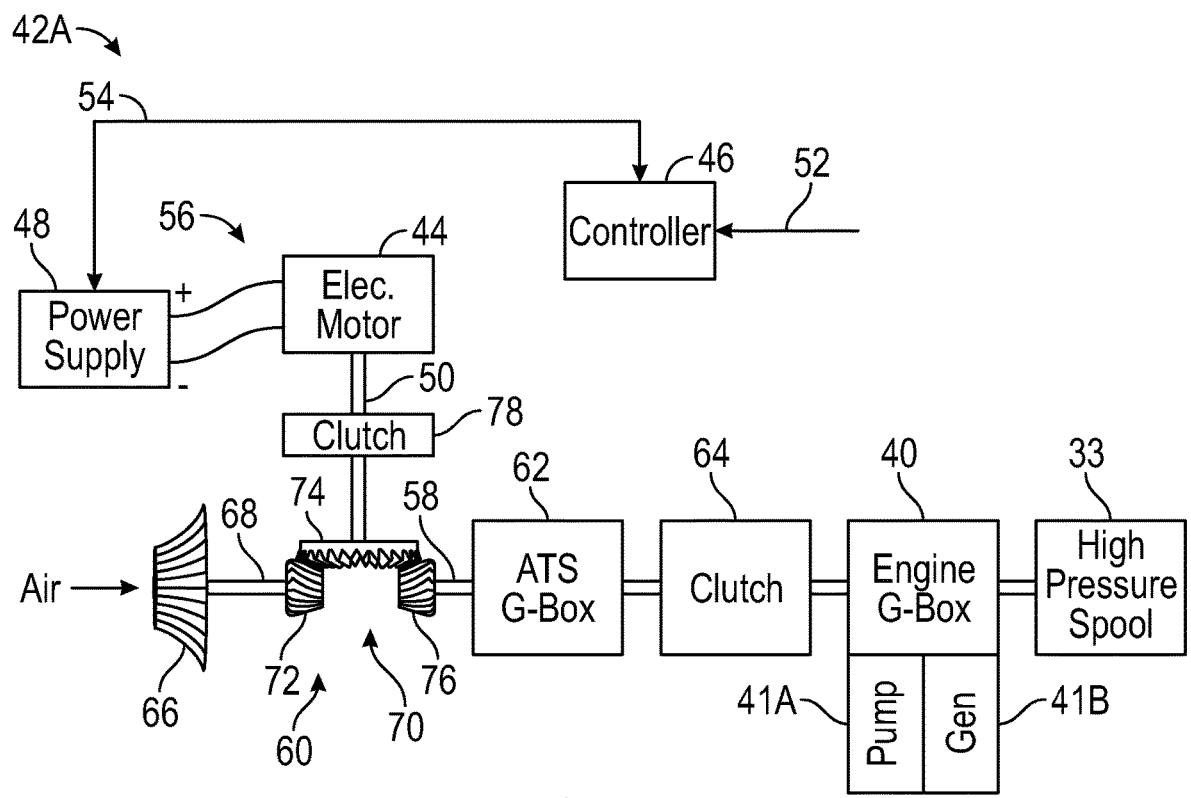
FIG. 3 is a block diagram of a bowed rotor prevention system according to another embodiment of the disclosure.

FIG. 3 is a block diagram of a bowed rotor prevention system 42A according to another embodiment. The example of FIG. 3 includes all of the elements of the bowed rotor prevention system 42 of FIG. 2 with an additional clutch 78 on motor shaft 50. The clutch 78 can allow the bowed rotor prevention motor 44 to be selectively engaged and disengaged, for instance, to support a maintenance operation or during an engine start operation.

Figure 4:
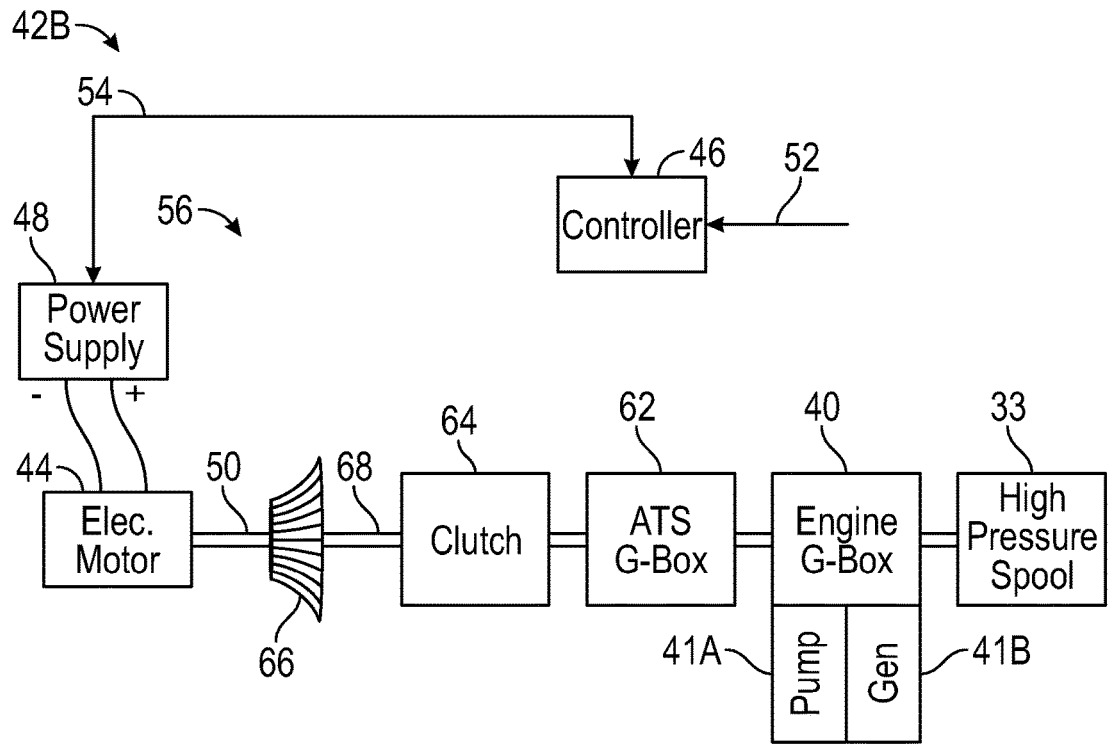
FIG. 4 is a block diagram of a bowed rotor prevention system according to another embodiment of the disclosure.
Figure 5:
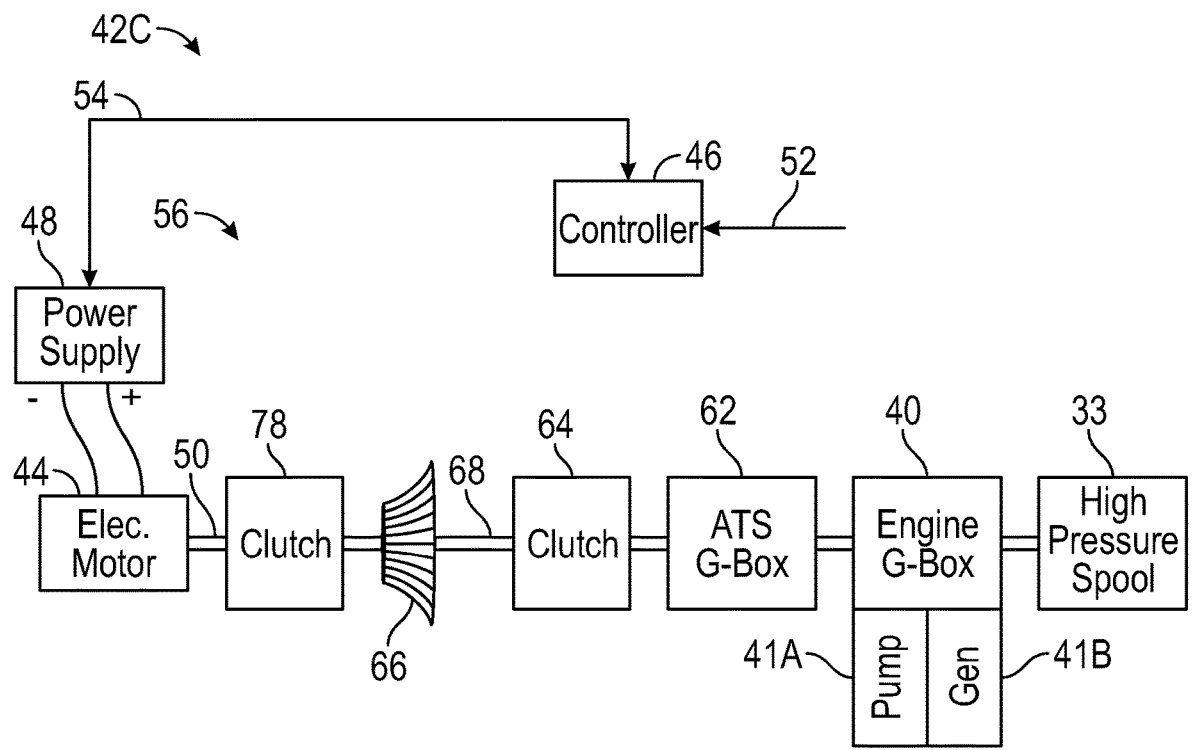
FIG. 5 is a block diagram of a bowed rotor prevention system according to another embodiment of the disclosure.

FIG. 4 is a block diagram of a bowed rotor prevention system 42B according to another embodiment. The example of FIG. 4 removes the gear interface 70 of FIG. 2 and positions the bowed rotor prevention motor 44 such that the motor shaft 50 is directly linked to the air turbine 66. The bowed rotor prevention system 42B also repositions clutch 64 between the air turbine 66 and the air turbine starter gearbox 62. In other embodiments, the clutch 64 may be positioned elsewhere in the system and/or one or more additional clutches can be included, such as a clutch on motor shaft 50 similar to clutch 78 of FIG. 3. For example, as depicted in bowed rotor prevention system 42C of FIG. 5, clutch 78 can be located on motor shaft 50 between the air turbine 66 and the bowed rotor prevention motor 44.

Figure 6:
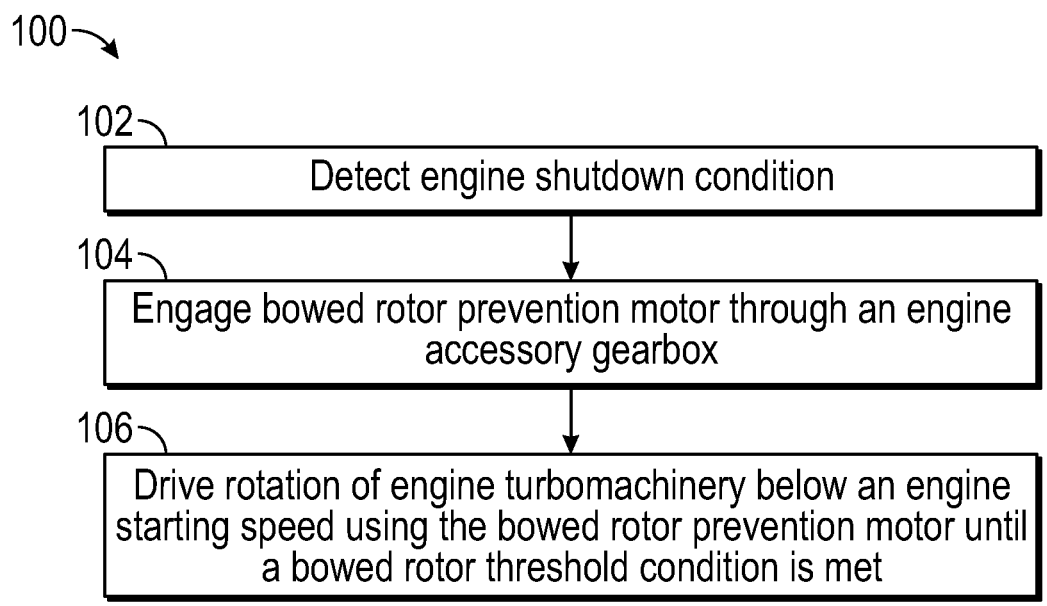
FIG. 6 is a process flow of a method according to embodiments of the disclosure.

FIG. 6 is a process flow of a method 100 according to an embodiment. The method 100 can be implemented by the bowed rotor prevention system 42 of FIGS. 1 and 2 and/or bowed rotor prevention systems 42A and 42B of FIGS. 3 and 4, and thus FIG. 6 is described with reference to FIGS. 1-5. At block 102, the controller 46 detects an engine shutdown condition of the gas turbine engine 10, for instance, based on receiving engine shutdown indicator 52. At block 104, the controller 46 engages the bowed rotor prevention motor 44 with turbomachinery of the gas turbine engine 10 through the engine accessory gearbox 40 by enabling a flow of electric current on the one or more power supply lines 56 from the power supply 48. At block 106, rotation of turbomachinery of the gas turbine engine 10 is driven by the bowed rotor prevention motor 44 below an engine starting speed until a bowed rotor prevention threshold condition is met. The bowed rotor prevention threshold condition can be a predetermined period of time. Alternatively, the bowed rotor prevention threshold condition can be a temperature value, a relative change in temperature value, or other condition indicative of a low probability of a bowed rotor. The bowed rotor prevention motor 44 rotates turbomachinery of the gas turbine engine 10 at a low speed (e.g., <5 RPM) until the bowed rotor prevention threshold condition is met.

Technical effects and benefits include using a bowed rotor prevention motor to slowly rotate turbomachinery of a gas turbine engine after shutdown to equalize a thermal gradient of rotating parts that were heated during operation. Interfacing the bowed rotor prevention motor through an air turbine starter enables the bowed rotor prevention motor to drive engine rotation using a preexisting gear-driven engine accessory. Rather than using an air starter driven by an auxiliary power unit for bowed rotor prevention, the bowed rotor prevention motor conserves air starter life and valve life through a dedicated low-speed, high-torque electric motor.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A bowed rotor prevention system for a gas turbine engine, the bowed rotor prevention system comprising:
   a bowed rotor prevention motor having a motor shaft and a motor bevel gear;
   an air turbine having an output shaft and an output bevel gear;
   a drive shaft operable to mechanically link to an engine accessory gearbox and having an input bevel gear, wherein
   the motor bevel gear, the output bevel gear, and the input bevel gear are coupled at a gear interface such that the bowed rotor prevention motor is operable to drive rotation of the gas turbine through the engine accessory gearbox.

2. The bowed rotor prevention system as in claim 1, wherein the bowed rotor prevention motor is an electric motor and further comprising a controller operable to control a flow of electric current from a power supply to the bowed rotor prevention motor.

3. The bowed rotor prevention system as in claim 1, further comprising a controller operable to engage the bowed rotor prevention motor based on detecting an engine shutdown condition of the gas turbine engine.

4. The bowed rotor prevention system as in claim 1, wherein the output shaft is driven to rotate by the air turbine responsive to rotation of the motor shaft and responsive to an airflow across the air turbine.

5. The bowed rotor prevention system as in claim 1, wherein the output shaft is coupled to an air turbine starter gearbox that is mechanically linked through a clutch to the engine accessory gearbox.

6. The bowed rotor prevention system as in claim 5, wherein a rotational force received at the engine accessory gearbox as driven by the motor shaft rotates a high pressure spool of the gas turbine engine.

7. The bowed rotor prevention system as in claim 1, wherein the motor shaft is mechanically linked to the air turbine through a clutch.

8. The bowed rotor prevention system as in claim 1, further comprising a controller operable to engage the bowed rotor prevention motor and drive rotation of the gas turbine engine below an engine starting speed until a bowed rotor prevention threshold condition is met, wherein the bowed rotor prevention threshold condition is a predetermined period of time.

9. The bowed rotor prevention system as in claim 1, further comprising a controller operable to disengage the bowed rotor prevention motor based on receiving a maintenance request.

10. The bowed rotor prevention system as in claim 1, wherein one or more of a hydraulic pump and an electric generator are disengaged from the engine accessory gearbox when the bowed rotor prevention motor is commanded to turn.

11. A gas turbine engine comprising:
an engine accessory gearbox configured to be coupled to a high pressure spool; and
a bowed rotor prevention system comprising:
 a bowed rotor prevention motor having a motor shaft and a motor bevel gear;
 an air turbine having an output shaft and an output bevel gear;
 a drive shaft operable to mechanically link to the engine accessory gearbox and having an input bevel gear, wherein
 the motor bevel gear, the output bevel gear, and the input bevel gear are coupled at a gear interface such that the bowed rotor prevention motor is operable to drive rotation of the gas turbine through the engine accessory gearbox.

12. The gas turbine engine as in claim 11, wherein the bowed rotor prevention motor is an electric motor and further comprising a controller operable to control a flow of electric current from a power supply to the bowed rotor prevention motor.

13. The gas turbine engine as in claim 11, further comprising a controller operable to engage the bowed rotor prevention motor based on detecting an engine shutdown condition of the gas turbine engine.

14. The gas turbine engine as in claim 11, wherein the output shaft is driven to rotate by the air turbine responsive to rotation of the motor shaft and responsive to an airflow across the air turbine.

15. The gas turbine engine as in claim 11, wherein the output shaft is coupled to an air turbine starter gearbox that is mechanically linked through a clutch to the engine accessory gearbox.

16. A method of bowed rotor prevention for a gas turbine engine, the method comprising:
engaging a bowed rotor prevention motor with turbomachinery of the gas turbine engine through an engine accessory gearbox of the gas turbine engine, wherein a motor shaft of the bowed rotor prevention motor interfaces with an air turbine operable to rotate an output shaft mechanically linked to the engine accessory gearbox;
interfacing an output bevel gear of the output shaft with a motor bevel gear of the motor shaft;
interfacing an input bevel gear of an air turbine starter drive shaft with the motor bevel gear; and
driving rotation of the turbomachinery of the gas turbine engine by the bowed rotor prevention motor below an engine starting speed until a bowed rotor prevention threshold condition is met.

17. The method as in claim 16, wherein the output shaft is driven to rotate by the air turbine responsive to rotation of the motor shaft and responsive to an airflow across the air turbine.

* * * * *